US005237030A

United States Patent [19]

Tang et al.

[11] Patent Number: 5,237,030

[45] Date of Patent: Aug. 17, 1993

[54] POLYMERIC COUPLERS PREPARED IN THE PRESENCE OF A COUPLER SOLVENT

[75] Inventors: Ping-Wah Tang; Philip T. S. Lau; Stanley W. Cowan, all of Rochester, N.Y.

[73] Assignee: Eastman Kodak Company, Rochester, N.Y.

[21] Appl. No.: 487,320

[22] Filed: Mar. 2, 1990

Related U.S. Application Data

[62] Division of Ser. No. 190,801, May 6, 1988.

[51] Int. Cl.[5] ........................ C08F 120/54; C08F 2/00

[52] U.S. Cl. .................................... 526/305; 526/193; 526/210; 526/213; 526/217

[58] Field of Search ................ 526/305; 430/548, 325, 430/381

[56] References Cited

U.S. PATENT DOCUMENTS

| | | | |
|---|---|---|---|
| 3,370,952 | 2/1968 | Dawson | 430/548 |
| 3,451,820 | 6/1969 | Umberger | 430/548 |
| 4,080,211 | 3/1978 | Van Paesschen | 430/548 |
| 4,511,647 | 4/1985 | Hirano et al. | 430/381 |
| 4,518,687 | 4/1985 | Hirano et al. | 430/548 |
| 4,612,278 | 9/1986 | Lau et al. | 430/381 |

*Primary Examiner*—Joseph L. Schofer
*Assistant Examiner*—Wu C. Cheng
*Attorney, Agent, or Firm*—Joshua G. Levitt

[57] ABSTRACT

Photographic elements are described containing a polymeric dye-forming coupler that has been formed by emulsion polymerization of ethylenically unsaturated monomers in the presence of a high-boiling organic coupler solvent. Couplers of high activity are obtained.

1 Claim, No Drawings

POLYMERIC COUPLERS PREPARED IN THE PRESENCE OF A COUPLER SOLVENT

This is a divisional of application Ser. No. 190,801, filed May 6, 1988.

FIELD OF INVENTION

This invention relates to silver halide color photographic materials containing polymeric dye-forming couplers. In a particular aspect it relates to such materials in which the coupler has been formed by emulsion polymerization of ethylenically unsaturated monomers in the presence of a high-boiling organic coupler solvent.

DESCRIPTION OF THE STATE OF THE ART

It is known that color photographic images can be formed by reaction between oxidized silver halide developing agent and a dye forming coupler. For example, a coupler of the acylacetanilide or benzoylacetanilide type generally is used for forming a yellow dye image; a coupler of the pyrazolone, pyrazoloazole, pyrazolobenzimidazole, cyanoacetophenone or indazolone type is generally used for forming a magenta dye image; and a phenolic or naphtholic coupler is generally used for forming a cyan dye image.

Many products which employ dye forming couplers to form a color image incorporate the coupler in the color photographic material prior to exposure. Color development leads to images in which a dye remains in the location where it is formed. With most such materials the coupler and the resulting dye are fixed in place as a result of bulk conferred by a ballast group. One such method of conferring bulk on a coupler to cause it to remain in place is to incorporate the coupler in a polymer backbone. U.S. Pat. Nos. 4,511,647; 4,518,687; and 4,612,278 are typical of recent polymeric coupler patents.

A problem with many polymeric couplers is that the activity of the coupler, as measured by density of dye formed, is less than that of non-polymeric couplers. Accordingly, it would be desirable to enhance the activity of polymeric couplers.

The addition of high boiling coupler solvents to polymeric couplers for the purpose of modifying dye hue and physical characteristics of a photographic element is known. Use of such solvents for the indicated purpose is disclosed in, e.g., U.S. Pat. Nos. 4,511,647 and 4,518,687, issued Apr. 6 and May 21, 1985, respectively. In these cases incorporation of the coupler solvent occurs after polymerization and during preparation of the coating composition. There has been no suggestion to incorporate the high boiling coupler solvent prior to dispersing the polymeric coupler, nor has there been any recognition in the art that the presence of such a solvent would influence the activity of the polymeric coupler.

SUMMARY OF THE INVENTION

We have found that the activity of polymeric couplers can be enhanced if they are prepared by an emulsion polymerization process in the presence of a high-boiling organic solvent, commonly known as a coupler solvent.

In one aspect this invention relates to a photographic element comprising a support, a silver halide emulsion layer, and a polymeric coupler wherein the polymeric coupler is an addition polymer of an ethylenically unsaturated monomer containing a dye forming coupler moiety prepared by emulsion polymerization in the presence of a high-boiling organic coupler solvent.

In another aspect the present invention relates to a process for the preparation of polymeric couplers which comprises emulsion polymerization of ethylenically unsaturated monomers containing a dye forming coupler moiety, the polymerization being carried out in the presence of a high-boiling organic coupler solvent.

DETAILED DESCRIPTION OF THE INVENTION

The coupler solvents useful in the emulsion polymerization process according to this invention are known water immiscible organic solvents having a boiling point above about 200° C.

Useful high-boiling organic solvents include phthalic acid alkyl esters such as dibutyl phthalate and dioctyl phthalate; phosphoric acid esters such as tricresyl phosphate, diphenyl phosphate, triphenyl phosphate, tris-2-ethylhexyl phosphate, tris-3,5,5-trimethylhexyl phosphate, and dioctyl butyl phosphate; citric acid esters such as tributyl acetylcitrate; benzoic acid esters such as octyl benzoate; dibasic aliphatic esters such as dibutoxyethyl succinate and dioctyl azelate; trimesic acid esters such as tributyl trimesate; aliphatic amides such as N,N diethyl lauramide and 1,4-cyclohexanedimethylene bis (2-ethylhexanote); and alkyl substituted phenols such as 2,4-di tert pentylphenol. Preferred solvents include di-n-butyl phthalate, tricresyl phosphate, tris-2-ethylhexyl phosphate, tris-3,5,5-trimethylhexyl phosphate, 2,4-di-tert-pentyl-phenol, and N,N-diethyl lauramide.

Since effective proportions of high-boiling coupler solvents present during the polymerization process of this invention may vary depending on the types of solvents and couplers used, the most effective ratio of solvent to coupler should be determined empirically. It has been found that useful results are obtained when a polymeric coupler is prepared by the process of this invention in the presence of from 1 to 75 weight percent, and preferably from 2 to 50 weight percent, of high-boiling coupler solvent (based on the weight of the polymer). Combinations of such solvents within the indicated ranges may also be used, and additional coupler solvents can be added after polymerization.

Any emulsion polymerized polymeric couplers derived from an ethylenically unsaturated dye-forming coupler moiety known in the art can be prepared in accordance with this invention.

Representative polymeric couplers are described in the following patents and published patent applications:

U.S. Pat. Nos. 3,926,436; 4,201,589; 4,436,808; 4,444,870; 4,455,363; 4,455,366; 4,474,870; 4,495,272; 4,500,634; 4,511,647; 4,518,687; 4,522,916; 4,576,909; 4,576,910; 4,576,911; 4,612,278; 4,631,251; German OLS 3,336,582; 3,432,396; and EP 0,133,262.

Preferred ethylenically unsaturated coupler moieties which can be copolymerized with other suitable non-dye-forming monomers are illustrated by the following structures:

Cyan Coupler Monomers

-continued
1
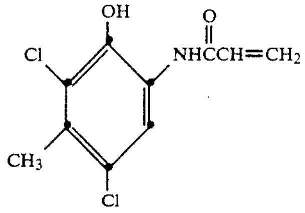
2
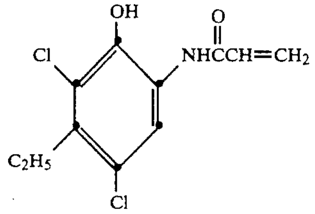
3
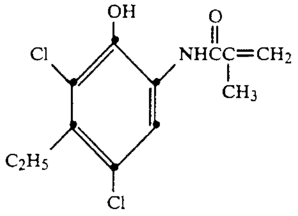
4
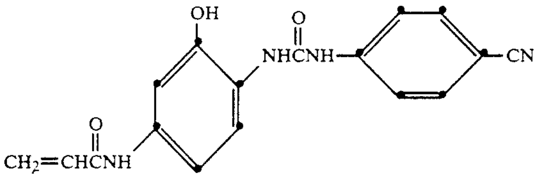
5
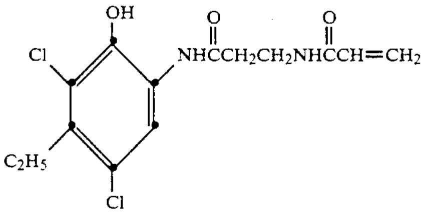
6
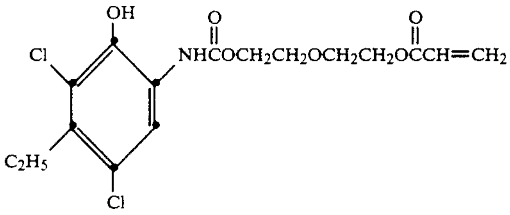
Magenta Coupler Monomers
1
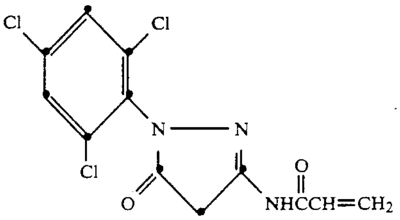
-continued
2
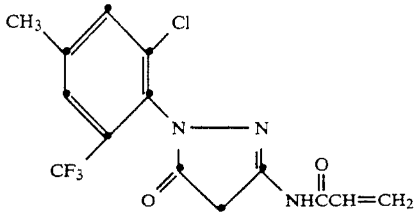
3
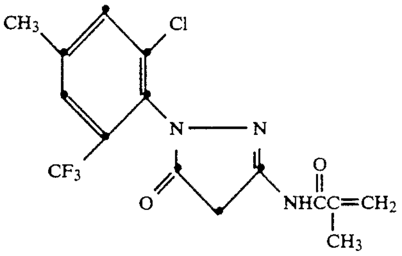
4
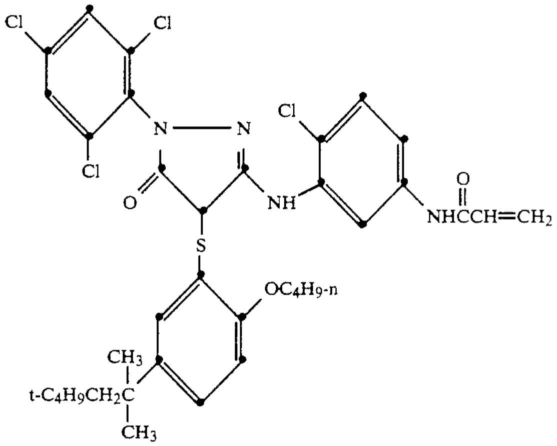
5
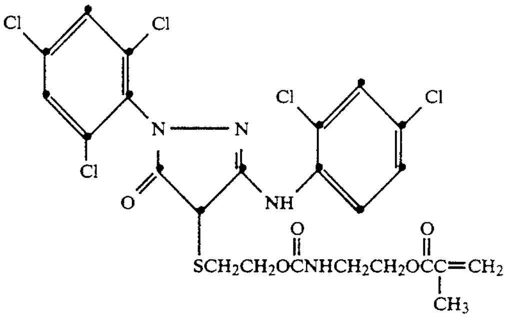
6
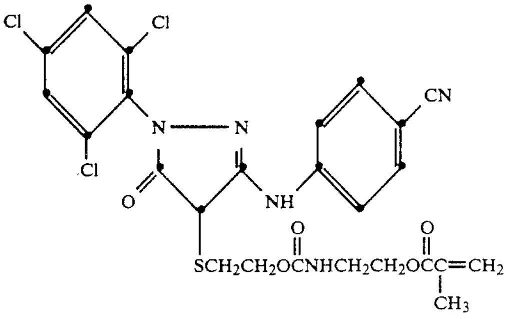

-continued
7
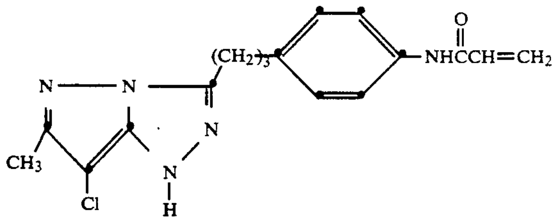
8
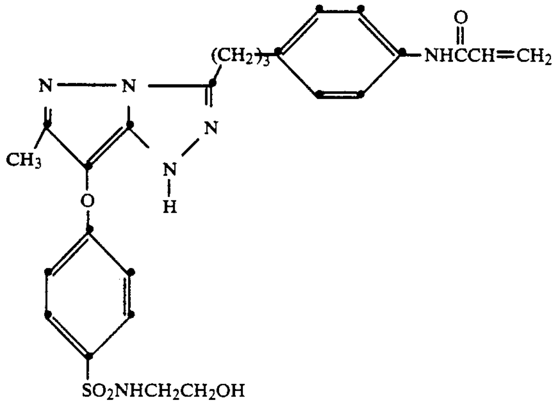
-continued
9
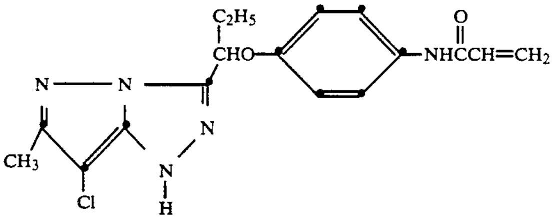
10
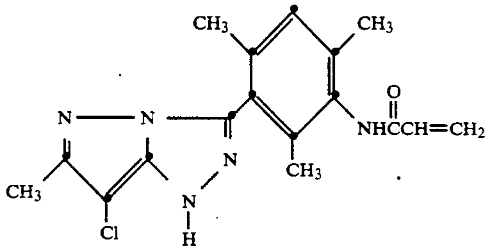
11
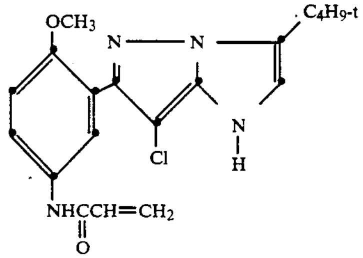
In the following structures, where R appears, it represents H or $CH_3$.
12
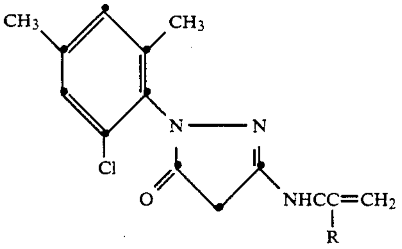
13
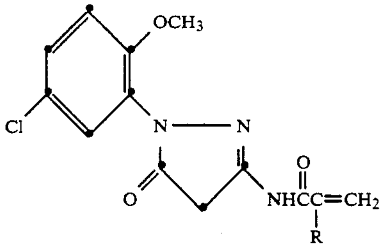
14
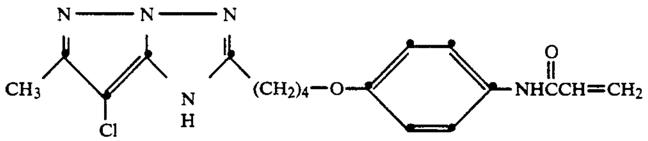
15
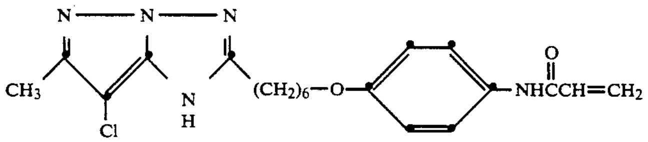
16
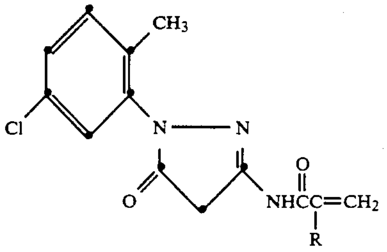
17
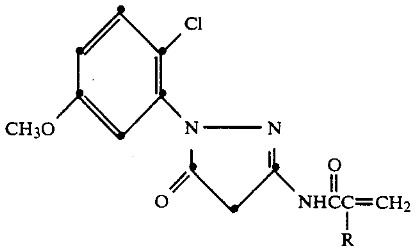

-continued
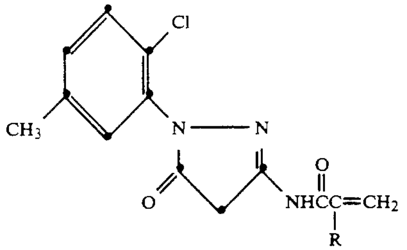
18
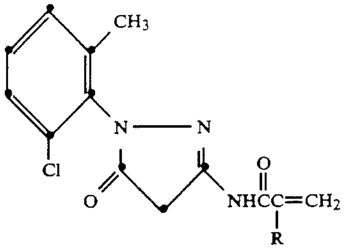
19
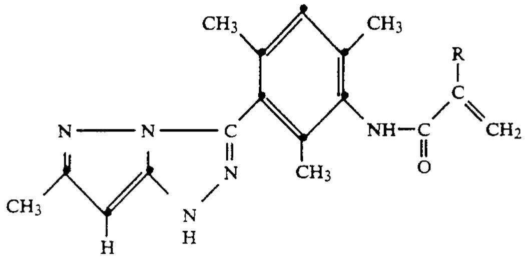
20
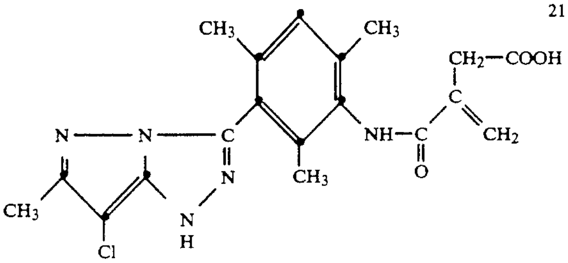
21
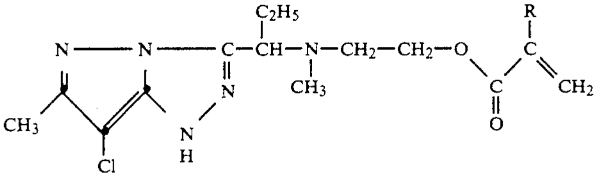
22
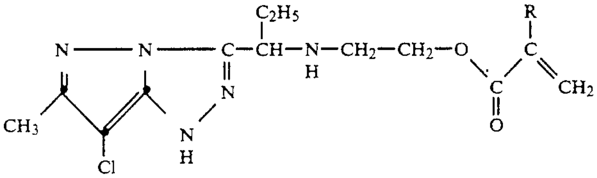
23
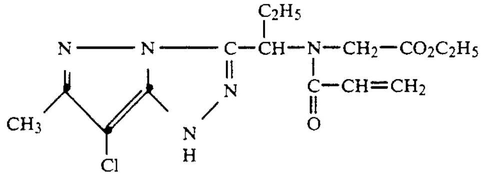
24
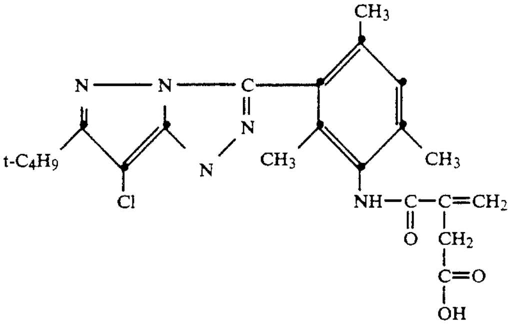
25
Yellow Coupler Monomers
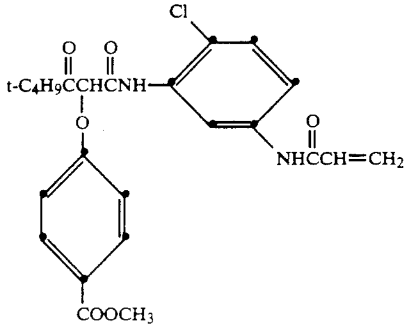
1
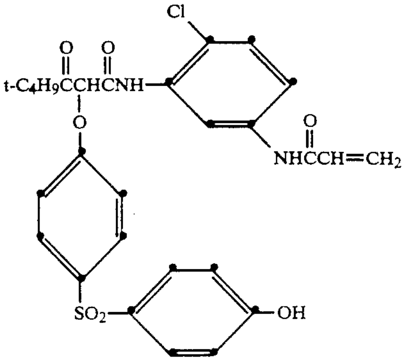
2

-continued

3

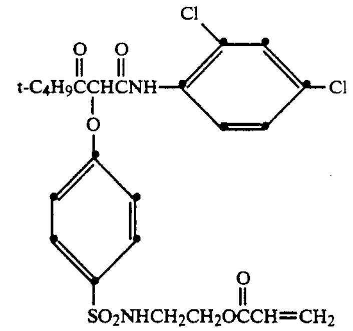

4

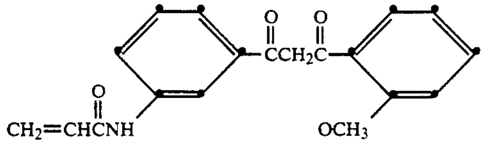

5

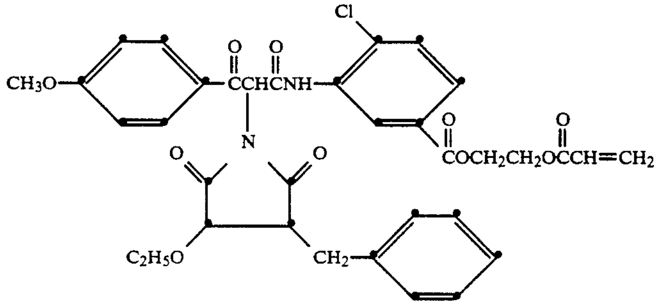

The polymeric couplers of this invention can be homopolymers derived from coupler containing monomers, or they can be copolymerized with one or more other suitable ethylenically unsaturated monomers including, for example, acrylic acid, methacrylic acid, acrylic acid esters, acrylic acid amides, vinyl esters, acrylonitrile, methacrylonitrile, aromatic vinyl compounds, vinylene chloride, itaconic acid and itaconic acid monoesters, citraconic acid, crotonic acid, maleic acid esters, N-vinyl-2-pyrrolidone, N-vinyl pyridine, vinyl alkyl esters such as methyl, ethyl, butyl and aryl esters such as phenyl esters.

In a preferred embodiment the polymeric coupler contains an acrylate, methacrylate, acrylamide or methacrylamide polymer backbone and further comprises repeating units derived from non-coupler containing comonomers selected to provide useful physical and chemical properties for the polymeric coupler, such as useful solubility, compatibility with other components of the photographic material, stability and flexibility. In an especially preferred embodiment, the polymeric backbone of the polymeric couplers of the invention includes the alkoxyacrylate comonomers disclosed in Lau et al. U.S. Pat. No. 4,612,278 issued Sep. 16, 1986.

The polymeric couplers of this invention can be used in the ways and for the purposes that polymeric couplers are used in the photographic art. They may be used in any concentration which is effective for the intended purpose. Generally, good results are obtained using concentrations ranging from $10^{-1}$ to 0.5 mole of polymeric coupler per mole of silver in the photographic element.

Photographic elements in which the polymeric couplers of this invention are incorporated can be a simple element comprising a support and a single silver halide emulsion layer or they can be multilayer, multicolor elements. The polymeric couplers of this invention can be incorporated in the silver halide emulsion layer or in another layer, such as an adjacent layer, where they will come into reactive association with oxidized color developing agent which has been formed by the development of silver halide in the emulsion layer. The silver halide emulsion layer can contain, or have associated with it, other photographic coupler compounds, such as color forming couplers, colored masking couplers, competing couplers, DIR couplers, DIAR couplers, and the like. These other Photographic coupler compounds can form dyes of the same or different color and hue as the polymeric coupler compounds of this invention. Additionally, the silver halide emulsion layer can contain addenda conventionally contained in such layers.

A typical photographic element of the invention comprises a support having thereon a cyan dye image forming unit comprising at least one red-sensitive silver halide emulsion layer having associated therewith at least one cyan dye forming coupler, a magenta dye image forming unit comprising at least one green sensitive silver halide emulsion layer having associated therewith at least one magenta dye-forming coupler, and a yellow dye image-forming unit comprising at least one blue-sensitive silver halide emulsion layer having associated therewith that least one yellow dye-forming coupler, at least one of the couplers in the element being a polymeric coupler as defined herein. The element can contain additional layers, such as filter layers, interlayers, overcoat layers, subbing layers, and the like.

In the following discussion of suitable materials for use in the emulsions and elements of this invention, reference will be made to *Research Disclosure*, December, 1987, Item 17643, published by Industrial Opportunities Ltd, Homewell Havant, Hampshire, PO9 1 EF, UK, the disclosures of which are incorporated herein by reference. This publication will be identified hereafter by the term "Research Disclosure".

The photographic elements of this invention or individual layers &hereof can be chemically sensitized, as described in Section III; contain brighteners, as described in Section V; antifoggants and stabilizers, as described in Section VI; antistain agents and image dye stabilizers, as disclosed in Section VII, Paragraphs I and J; light absorbing and scattering materials, as described in Section VIII; hardeners, as described in Section XI; plasticizers and lubricants, as described in Section XII; antistain agents, as described in Section XIII; matting agents, as described in Section XVI; and development modifiers, as described in Section XXI of the Research Disclosure. The photographic elements can be coated on a variety of supports as described in Research Disclosure Section XVII and the references described therein.

In addition, the elements can contain a high-boiling organic solvent added after completion of the coupler polymerization reaction to modify the physical properties of the elements' layers, as is disclosed in, e.g., U.S. Pat. No. 4,511,647 issued Apr. 16, 1985. Any such optionally added high-boiling organic solvents may be the same as or different from one that is present during the coupler polymerization reaction in accordance with this invention.

Photographic elements can be exposed to actinic radiation, typically in the visible region of the spectrum, to form a latent image as described in Research Disclosure Section XVIII and then processed to form a visible dye image as described in Research Disclosure Section XIX. Processing to form a visible dye image includes the step of contacting the element with a color developing agent to reduce developable silver halide and oxidize the color developing agent. Oxidixed color developing agent in turn reacts with the coupler to yield a dye.

Development is followed by the conventional steps of bleaching, fixing, or bleach fixing, to remove silver and silver halide, washing and drying.

The polymeric couplers prepared by the method according to this invention are useful in combination with other couplers, such as monomeric and/or polymeric couplers known in the photographic art, such as those described in Research Disclosure Section VII, Paragraphs D, E, F, and G and the publications cited therein. These couplers can be incorporated in the elements and emulsions as described in Research Disclosure Section VII, Paragraph C and the publications cited therein.

The polymeric couplers of this invention can be made by following procedures generally known in the organic compound synthesis art.

The polymeric couplers are prepared by emulsion polymerization of suitable ethylenically unsaturated monomers in the presence of a high boiling solvent as described herein, and then dispersed in an aqueous gelatin solution. Suitable emulsion polymerization methods are disclosed in, for example, U.S. Pat. Nos. 3,370,952; 4,080,211; and 4,612,278 . The procedures described in these patents are modified at least to the extent that a high-boiling coupler organic solvent is incorporated in the reaction mixture prior to or during polymerization.

Typically the polymerizable monomers and the coupler solvent are combined with water and an emulsifier, such as a surfactant, and then polymerized at elevated temperature by the addition of a catalyst, such as ammonium persulfate/sodium bisulfate; dimethyl 2,2'-azobisisobutyrate; 2,2'-azobisisobutyronitrile; 2,2'-azobis(amidino propane) dihydrochloride.

The procedures described below for the syntheses of representative examples of polymeric couplers within the scope of this invention are illustative of the process used for the emulsion polymerization of ethylenically unsaturated coupler moieties in the presence of a high-boiling coupler solvent.

Preparative Example: Preparation of Coupler C

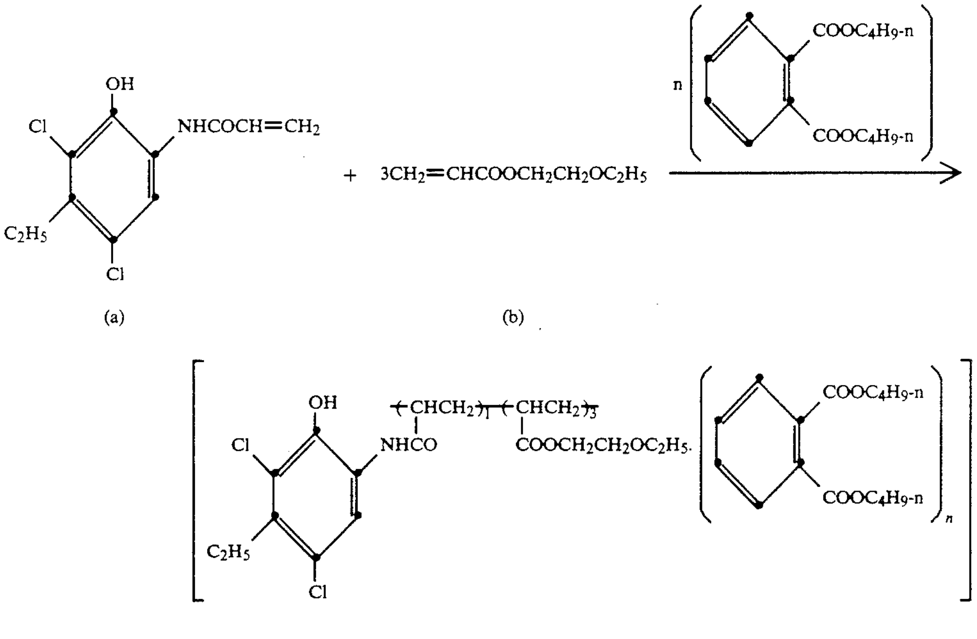

(a) (b) (c)

7.803 g (0.03 mole) of coupler monomer (a), 12.976 g (0.09 mole) of acrylate monomer (b), and 1.67 g (0.006 mole) of di n-butyl-phthalate were placed in a 500-ml, four-necked, round-bottomed Morton flask, set in a constant temperature water bath at 90° C. and equipped with a mechanical stirrer, a nitrogen inlet tube, a reflux condenser and an additional funnel. The amount of di n-butyl phthalate was varied with the result shown in Table la below. The mixture was thoroughly stirred To the mobile yellow slurry were added sequentially 60 ml of an aqueous solution (0.1 mole/liter) of sodium dodecyl sulfate, and 60 ml of nitrogen-purged distilled water, followed by the dropwise addition over a period of 15 minutes of 9 ml of an aqueous solution (0.1 mole/liter) of ammonium persulfate. Stirring was continued for two hours, after which the starting coupler monomer (a) was shown by thin layer chromatography (TLC) to have been completely consumed. After cooling to room temperature, the precipitate-free latex was dialyzed for three days. A sample was freeze dried for analysis.

Yield of Coupler C: 95%.

The equivalent weight and the ratio of coupler monomer (a) to acrylate monomer (b) were obtained from chlorine analysis; the amount of di-n-butylphthalate incorporated into the latex particles was determined by high pressure liquid chromatographic (HPLC) analysis.

Preparative Example: Preparation of Coupler I

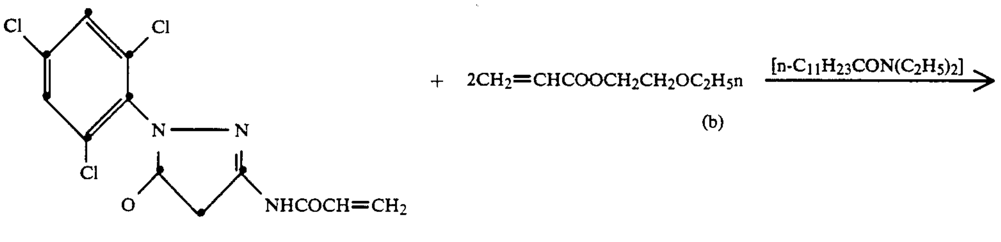

(d)

(b)

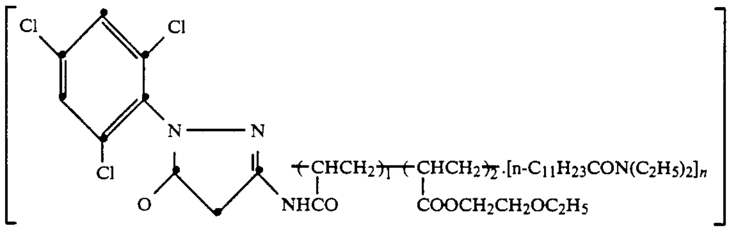

(I)

6.7 g (0.02 mole) of coupler monomer (d), 3.1 g (0.04 mole) of acrylate monomer (b), 3.1 g (equivalent to 25 weight % of polymer) of N,N-diethyllauramide, and 1.15 g (0.004 mole) of sodium dodecyl sulfate in 100 ml nitrogen purged distilled water were placed in a 300-ml beater. The mixture was thouroughly mixed and then treated in a Waring blender for 30 seconds. The emulsified mixture was then transferred to a 1-liter, 3-necked flask set in a 90° C. constant temperature water bath. To this mixture were added 12 ml (0.0012 mole) of an aqueous solution (0.1 mole/liter) of sodium bisulfide, followed by the dropwise addition of 12 ml (0.0012) of an aqueous solution (0.1 mole/ liter) of ammonium persulfate. Stirring was continued for two hours, after which all of the starting coupler monomer (a) was shown by TLC to have been consumed. After cooling to room temperature, the pH of the latex was adjusted from 3.5 to 6.0 with sodium hydroxide. The latex was filtered and dialized for two days. A sample was freeze dried for analysis.

Yield of Coupler I: 94%.

The equivalent weight and the ratio of coupler monomer (d) to acrylate monomer (b) were obtained from chlorine analysis; the amount of N,N-diethyllauramide incorporated into the latex particles was determined by HPLC analysis.

Other polymeric couplers of the invention shown in the examples which follow are synthesized by analogous procedures in which the identity and/or amount of coupler solvent is varied.

The following examples are included for a further understanding of the invention.

EXAMPLE 1

Four photographic elements were prepared with polymeric couplers in which the presence and amount of high-boiling coupler solvent varied. Each element was composed to the following layers coated on a cellulose acetate butyrate) film support:

Layer (I) Gelatin (1.08 g/$m^2$)
Bis(vinylsulfonylmethyl)ether (hardener)
(0.09 g/$m^2$)

Layer (II) Gelatin (3.77 g/$m^2$)
Polymeric coupler (see below) ($1.5 \times 10^{-3}$ mole/$m^2$)
Polydispersed sulfur and gold sensitized
AgBrI (6.5% I) gelatino emulsion
(0.90 g Ag/$m^2$)

Film Support

Polymeric couplers contained in Elements 1-4:

-continued

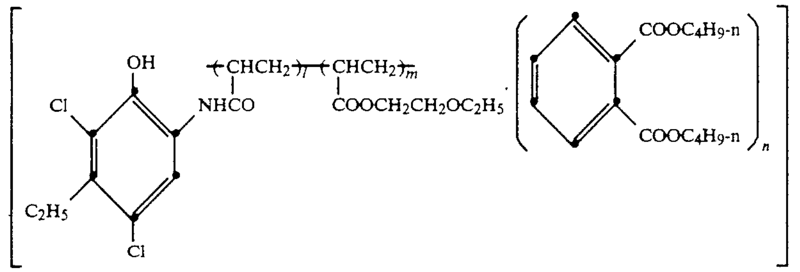

| | Element | m mol % Comonomer | n mol % Solvent | Weight % Solvent Based on Weight of Coupler |
|---|---|---|---|---|
| 1 | Comparison coupler | 3.23 | 0 | — |
| 2 | Coupler A of invention | 3.33 | 0.20 | 8 |
| 3 | Coupler B of invention | 3.31 | 0.40 | 16 |
| 4 | Coupler C of invention | 3.30 | 1.26 | 50 |

Each element was imagewise exposed through a graduated-density test object and then processed as described below.

| Processing Solution | Time | Temp. |
|---|---|---|
| Developer | 2 min. | 40° C. |
| Stop Bath | 2 min. | 40° C. |
| Wash | 2 min. | 40° C. |
| Bleach | 3 min. | 40° C. |
| Wash | 2 min. | 40° C. |
| Fixer | 2 min. | 40° C. |
| Wash | 2 min. | 40° C. |

Processing Solution Formulations

| | | |
|---|---|---|
| Developer | | |
| Water | 900.0 | mL |
| Potassium sulfite | 2.0 | g |
| 4-amino-3-methyl-N-β-(methanesul fonamido)ethylaniline developing agent | 5.0 | g |
| Potassium carbonate (anhydrous) | 30.0 | g |
| Potassium bromide | 1.25 | g |
| Potassium iodide | 0.6 | g |
| Water to make | 1.0 | L |
| Stop Bath | | |
| Glacial acetic acid | 30.00 | mL |
| Water to make | 1.0 | L |
| Bleach | | |
| Water | 800.0 | g |
| Sodium bromide | 21.5 | g |
| Potassium ferricyanide | 100.0 | g |
| Monosodium phosphate monohydrate | 0.07 | g |
| Water to make | 1.0 | L |
| Fixer | | |
| Water | 750.0 | mL |
| Sodium sulfite | 6.0 | g |
| Sodium metabisulfite | 1.5 | g |
| Sodium thiosulfate pentahydrate | 250.0 | g |
| Sodium hydroxide (50% solution) | 0.3 | mL |
| Water to make | 1.0 | L |
| pH @ 75° F. 7.0 | | |

The red maximum density ($D_{max}$) of the cyan image was measured and is shown in Table 1.

TABLE 1

| Element No. | | $D_{max}$ |
|---|---|---|
| 1 | Comparison Coupler | 1.65 |
| 2 | Coupler A of Invention | 1.98 |
| 3 | Coupler B of Invention | 2.04 |
| 4 | Coupler C of Invention | 2.29 |

In every case, the polymeric coupler prepared in the presence of a high-boiling coupler solvent provided a higher maximum dye density than the comparison polymeric coupler prepared in the absence of such solvent.

EXAMPLE 2

Two additional elements, Elements 5 and 6, were prepared, processed and evaluated as described in Example 1. Element 5 contained the comparison coupler of Example 1 which had been combined with 50% by weight of the coupler solvent di-n-butyl phthalate after completion of the polymerization reaction and prior to the coupler's incorporation in the coating composition. Element 6 contained Coupler C of the invention as identified in Example 1. The results are shown in Table 2.

TABLE 2

| Element No. | | $D_{max}$ |
|---|---|---|
| 5 | Comparison | 2.09 |
| 6 | Coupler C | 2.29 |

The data shown in Table 2 demonstrate the superiority of a polymeric coupler prepared by the method according to the invention over a polymeric coupler to which the high-boiling coupler solvent had been conventionally added as a dispersant subsequent to the coupler polymerization reaction.

EXAMPLE 3

Elements 7-12 prepared as described in Example 1, and containing the polymeric couplers identified in Table 3a, were processed and evaluated as in Example 1. The solvent was incorporated at 4% by weight, based on the weight of the coupler. Results are shown in Table 3b.

TABLE 3a

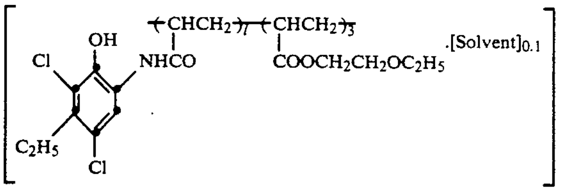

| Coupler | Solvent |
|---|---|
| D | 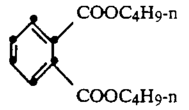 |
| E | 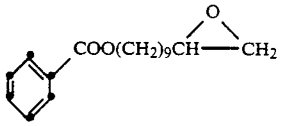 |
| F | 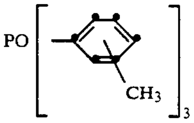 |
| G | 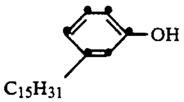 |
| H | 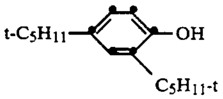 |

TABLE 3b

| Element No. | | $D_{max}$ |
|---|---|---|
| 7 | Comparison Coupler | 1.43 |
| 8 | Coupler D of Invention | 1.63 |
| 9 | Coupler E of Invention | 1.73 |
| 10 | Coupler F of Invention | 1.57 |
| 11 | Coupler G of Invention | 1.78 |
| 12 | Coupler H of Invention | 1.63 |

The data in Table 3b show the effectiveness of a variety of different high-boiling coupler solvents in producing images having improved maximum densities, even where the proportion of incorporated solvent is low.

EXAMPLE 4

Elements 13-16, prepared as described in Example 1, and containing the polymeric couplers identified in Table 4a were processed and evaluated as described before except that the developer solution had the following composition: Results are shown in Table 4b.

TABLE 4a

Elements 13-16 contained the following polymeric couplers:

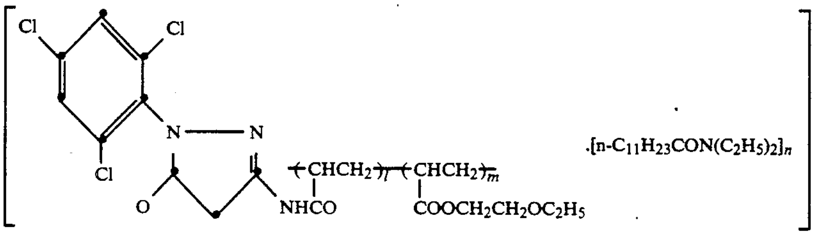

| Element | | m mol % Comonomer | n mol % Solvent | Weight % Solvent Based on Weight of Coupler |
|---|---|---|---|---|
| 13 | Comparison coupler | 2.05 | 0 | — |
| 14 | Coupler I of invention | 1.61 | 0.69 | 31 |
| 15 | Coupler J of invention | 1.69 | 0.93 | 41 |
| 16 | Coupler K of invention | 1.45 | 1.08 | 51 |

The maximum green density of the magenta image (Dmax) produced in each element is shown in Table 4b.

TABLE 4b

| Element No. | | $D_{max}$ |
|---|---|---|
| 13 | Comparison Coupler | 1.53 |
| 14 | Coupler I of Invention | 1.71 |
| 15 | Coupler J of Invention | 1.58 |
| 16 | Coupler K of Invention | 1.44 |

The data in Table 4b indicate the usefulness of the process of this invention with respect to magenta-dye-forming couplers, but also illustrates that with some couplers, too much solvent does not provide an improvement.

The invention has been described in detail with particular reference to preferred embodiments thereof, but it will be understood that variations and modifications can be effected within the spirit and scope of the invention.

We claim:

1. A process for the preparation of polymeric couplers which comprises emulsion polymerization of an ethylenically unsaturated monomer containing a dye-forming coupler moiety, the polymerization being carried out in the presence of a high-boiling organic coupler solvent having a boiling point above 200° C., wherein the high-boiling coupler solvent is a member selected from the group consisting of phthalic acid alkyl esters,
phosphoric acid esters,
citric acid esters,
benzoic acid esters,
alkylamides,
dibasic aliphatic esters,
trimesic acid esters, and
alkylated phenols.

* * * * *